United States Patent
Endo (10) Patent No.: US 8,820,762 B2
(45) Date of Patent: Sep. 2, 2014

(54) PRESSURE BUFFER DEVICE AND SUSPENSION DEVICE

(71) Applicant: Showa Corporation, Gyoda (JP)

(72) Inventor: Hiroshi Endo, Gyoda (JP)

(73) Assignee: Showa Corporation, Gyoda-Shi (JP)

( * ) Notice: Subject to any disclaimer, the term of this patent is extended or adjusted under 35 U.S.C. 154(b) by 0 days.

(21) Appl. No.: 13/948,511

(22) Filed: Jul. 23, 2013

(65) Prior Publication Data
US 2014/0138931 A1  May 22, 2014

(30) Foreign Application Priority Data
Nov. 21, 2012 (JP) ................................. 2012-255305

(51) Int. Cl.
*B60G 11/27* (2006.01)

(52) U.S. Cl.
USPC .................................................. 280/124.157

(58) Field of Classification Search
CPC ...... B60G 17/044; B60G 15/12; B60G 15/06; B60G 11/27; B60G 2202/152
USPC ................. 280/124.157, 124.159; 267/64.16, 267/64.17; 188/314, 315, 316, 322.19, 297
See application file for complete search history.

(56) References Cited

U.S. PATENT DOCUMENTS 3,729,184 A * 4/1973 Allinquant et al. ........ 267/64.17
8,074,974 B2 * 12/2011 Nogami et al. ............ 267/64.17
8,596,431 B2 * 12/2013 Bruder .......................... 188/297

FOREIGN PATENT DOCUMENTS

JP          60244609 A  * 12/1985  ............ B60G 17/00
JP        2011-202786 A    10/2011

* cited by examiner

*Primary Examiner* — Faye M. Fleming
(74) *Attorney, Agent, or Firm* — Leason Ellis LLP (57) ABSTRACT

A pressure buffer device includes a bypass path configured to form a channel of the oil from the a second oil chamber to the a first oil chamber, a slit valve connected to the bypass path, configured to form an inflow route of the oil from the bypass path to a pressure chamber, and having a channel sectional area smaller than a channel sectional area of the bypass path, and a communication path connected to the bypass path, configured to form an inflow route of the oil from the bypass path to an annular recess, and having a channel sectional area larger than the channel sectional area of the slit valve and smaller than the channel sectional area of the bypass path.

8 Claims, 9 Drawing Sheets

PRESSURE BUFFER DEVICE AND SUSPENSION DEVICE

CROSS-REFERENCE TO RELATED APPLICATIONS

This application is based on and claims priority under 35 U.S.C. 119 from Japanese Patent Application No. 2012-255305 filed on Nov. 21, 2012, the entire content of which is incorporated herein by reference.

BACKGROUND OF THE INVENTION

1. Field of the Invention

The present invention relates to a pressure buffer device and a suspension device.

2. Description of the Related Art

A suspension device of a vehicle such as an automobile include a pressure buffer device, in which a damping force generator is used, in order to appropriately reduce a vibration transmitted from a road surface to a vehicle body during traveling and improve riding comfort and operation stability. As the pressure buffer device of this type, there is proposed a pressure buffer device including a damping force adjusting mechanism which, for example, increases a damping force in a low-frequency range and reduces the damping force in a high-frequency range according to the frequency of a vibration that changes in response to a condition of the road surface (see, for example, Japanese Patent Application Laid-Open No. 2011-202786).

SUMMARY OF THE INVENTION

In a high-speed range, in the case of a sudden change during, for example, a steep turn or bad road traveling, it is necessary to increase a damping force and improve operation stability. This is also requested in, for example, a pressure buffer device including a damping force adjusting mechanism which increases a damping force in a low-frequency range and reduces the damping force in a high-frequency range.

An illustrative aspect of the invention is to improve responsiveness of a damping force in a high-speed range in a pressure buffer device including a damping force adjusting mechanism which increases a damping force in a low-frequency range and reduces the damping force in a high-frequency range.

According to an aspect of the present invention, there is provided a pressure buffer device including: a cylinder configured to store liquid; a partitioning member configured to partition a space in the cylinder into a first liquid chamber and a second liquid chamber for storing the liquid; a channel section configured to form a channel of the liquid from the second liquid chamber to the first liquid chamber; a releasing and blocking section configured to release and block a flow of the liquid flowing from the second liquid chamber to the first liquid chamber via the channel section; a first space forming section opposed to one side of the releasing and blocking section and configured to form a space for receiving inflow of the liquid; a second space forming section opposed to the other side of the releasing and blocking section and configured to form a space for receiving inflow of the liquid; a first inflow section connected to the channel section, configured to form an inflow route of the liquid from the channel section to the first space forming section, and having a channel sectional area smaller than a channel sectional area of the channel section; and a second inflow section connected to the channel section, configured to form an inflow route of the liquid from the channel section to the second space forming section, and having a channel sectional area larger than the channel sectional area of the first inflow section and smaller than the channel sectional area of the channel section.

In the pressure buffer device, the partitioning member may include a communication channel configured to allow the flow of the liquid between the first liquid chamber and the second liquid chamber. The pressure buffer device further may include a rod member, which is a bar-like member, configured to hold one end side of the partitioning member in an axis direction, the rod member moves in the axis direction, and the channel section is formed in the rod member.

The pressure buffer device may further include an opposed member which is provided to be opposed to the releasing and blocking section, in which the second inflow section is configured by a cutout provided in the opposed member and formed to connect the channel section and the second space forming section.

The pressure buffer device may further include an opposed member which is provided to be opposed to the releasing and blocking section, in which the second inflow section is configured by a hole provided in the opposed member and formed to connect the channel section and the second space forming section.

According to another aspect of the present invention, there is provided a suspension device including: a spring configured to reduce a vibration and a shock; and a pressure buffer device configured to damp a vibration by the spring, wherein the pressure buffer device includes: a cylinder configured to store liquid; a partitioning member configured to partition a space in the cylinder into a first liquid chamber and a second liquid chamber for storing the liquid; a channel section configured to form a channel of the liquid from the second liquid chamber to the first liquid chamber; a releasing and blocking section configured to release and block a flow of the liquid flowing from the second liquid chamber to the first liquid chamber via the channel section; a first space forming section opposed to one side of the releasing and blocking section and configured to form a space for receiving inflow of the liquid; a second space forming section opposed to the other side of the releasing and blocking section and configured to form a space for receiving inflow of the liquid; a first inflow section connected to the channel section, configured to form an inflow route of the liquid from the channel section to the first space forming section, and having a channel sectional area smaller than a channel sectional area of the channel section; and a second inflow section connected to the channel section, configured to form an inflow route of the liquid from the channel section to the second space forming section, and having a channel sectional area larger than the channel sectional area of the first inflow section and smaller than the channel sectional area of the channel section.

With any of the configurations discussed above, it is possible to improve responsiveness of a damping force in a high-speed range in a pressure buffer device including a damping force adjusting mechanism which increases the damping force in a low-frequency range and reduces the damping force in a high-frequency range.

DETAILED DESCRIPTION OF EMBODIMENTS OF THE INVENTION

An embodiment of the present invention is explained in detail below with reference to the accompanying drawings.

Figure 1:
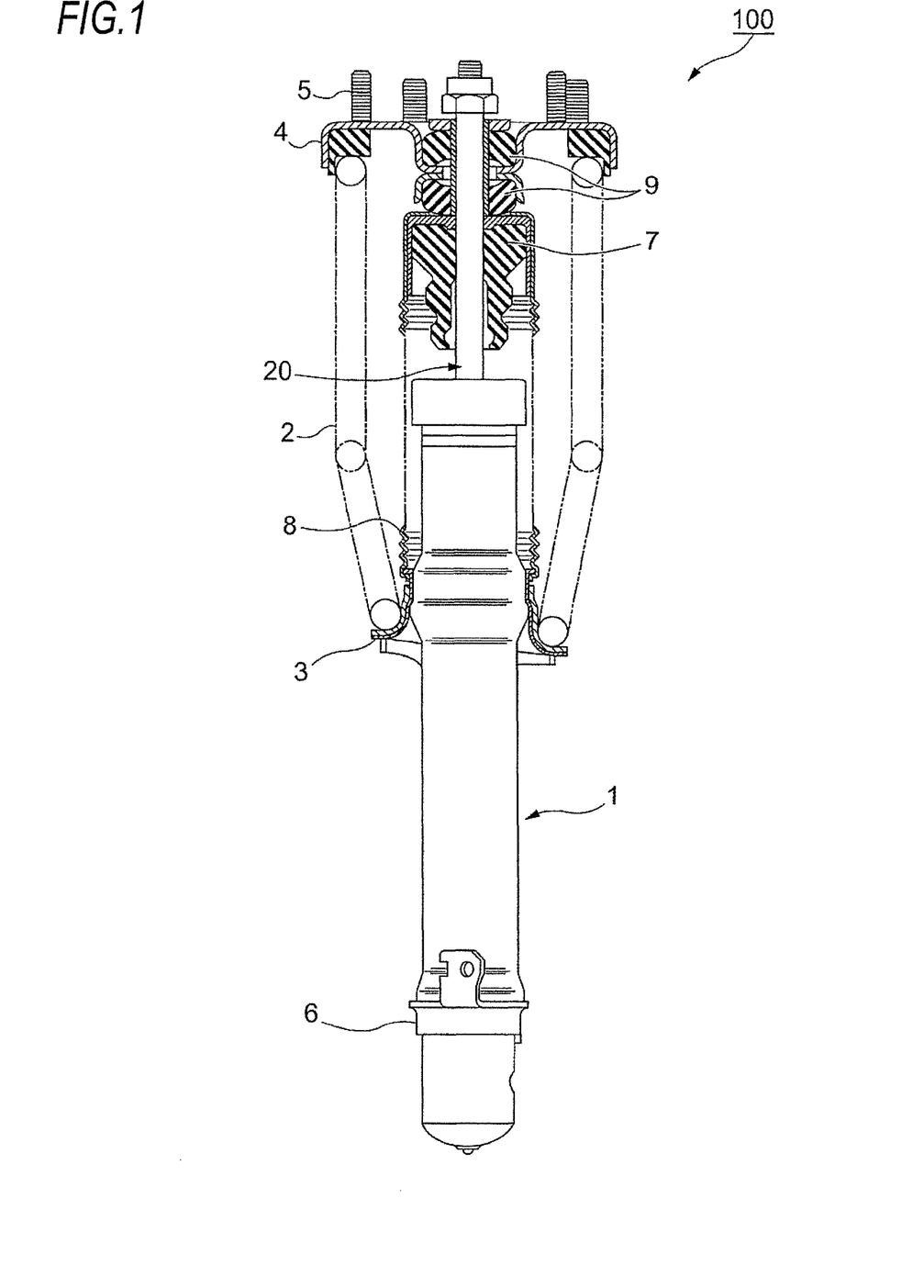
FIG. 1 is a diagram showing a schematic configuration of a suspension device according to an embodiment.

FIG. 1 is a diagram showing a schematic configuration of a suspension device 100 according to this embodiment.

The suspension device 100 includes, as shown in FIG. 1, a hydraulic buffer device 1 and a coil spring 2 arranged on the outer side of the hydraulic buffer device 1. The suspension device 100 includes a lower spring sheet 3 attached to the outer circumference of the hydraulic buffer device 1 and configured to support the lower end of the coil spring 2 and an upper spring sheet 4 attached to the outer circumference on the end side of the hydraulic buffer device 1 and configured to support the upper end of the coil spring 2. Bolts 5 for attaching the suspension device 100 to a vehicle body or the like are attached to the upper spring sheet 4. Further, the suspension device 100 includes a wheel side attaching section 6 provided in a lower part of the hydraulic buffer device 1.

The suspension device 100 includes a bump rubber 7 pressed into the outer circumference of a piston rod 20 explained below that jumps out from the hydraulic buffer device 1. The suspension device 100 includes a bellows-like dust cover 8 configured to cover an end of a part of the hydraulic buffer device 1 and the outer circumference of the piston rod 20 that jumps out from the hydraulic buffer device 1. Further, the suspension device 100 includes a plurality of (two in this embodiment) mount rubbers 9 arranged in an up down direction on the upper end side of the piston rod 20 and configured to absorb a vibration.

Figure 2:
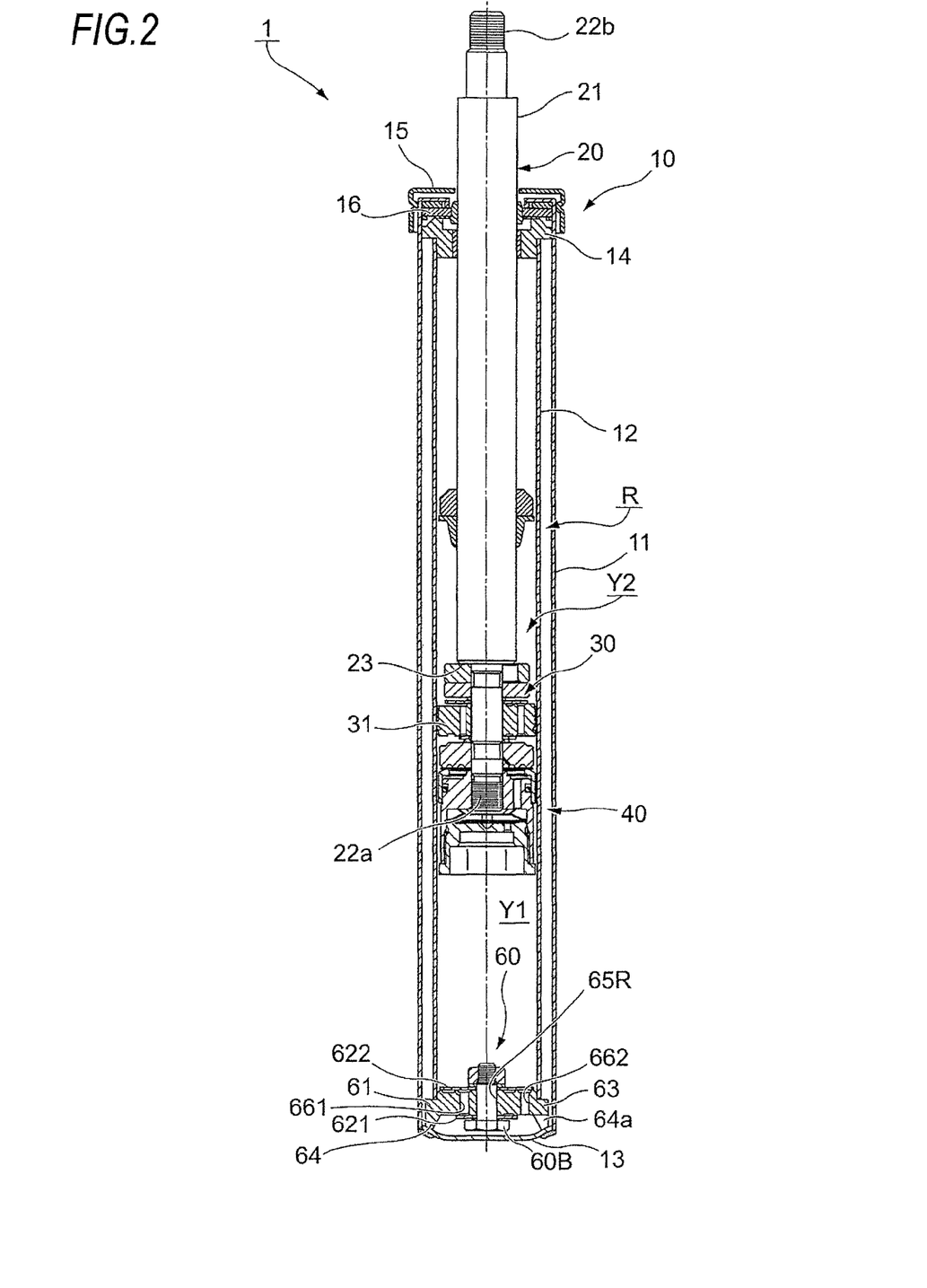
FIG. 2 is an overall configuration diagram of a hydraulic buffer device according to the embodiment.

FIG. 2 is an overall configuration diagram of the hydraulic buffer device 1 according to this embodiment.

Figure 3A:
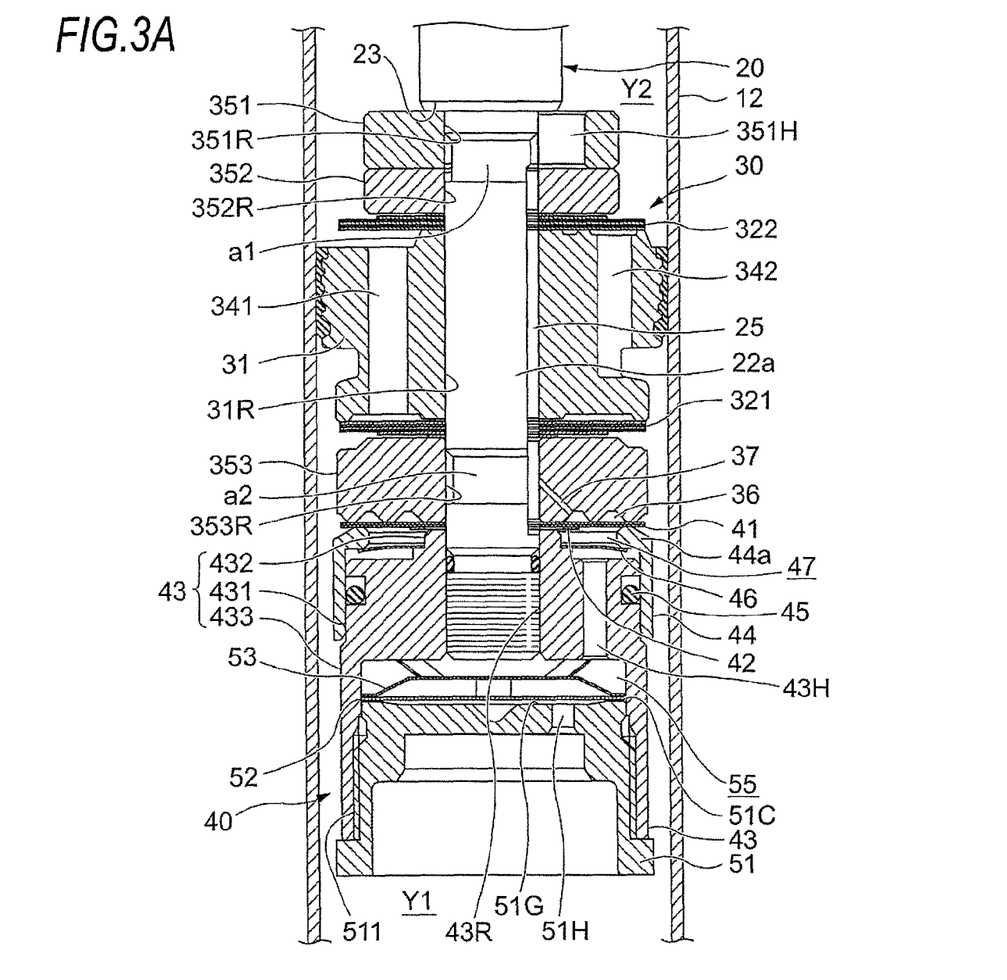
FIGS. 3A to 3C are diagrams for explaining the hydraulic buffer device in detail.
Figure 3B:
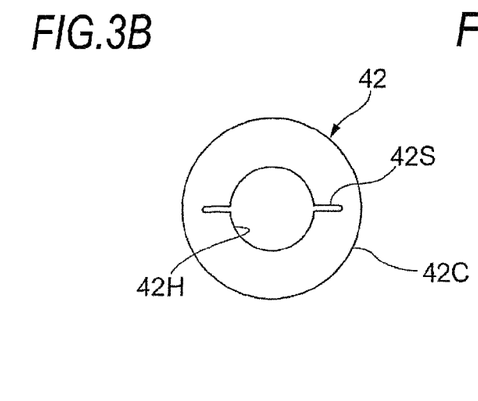
Figure 3C:
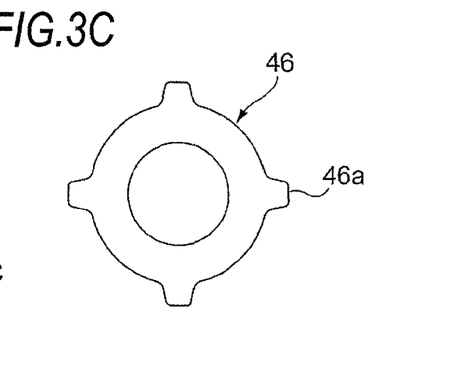

FIGS. 3A to 3C are diagrams for explaining the hydraulic buffer device 1 in detail.

As shown in FIG. 2, the hydraulic buffer device 1 is a double-cylinder hydraulic buffer device that configures a part of a frequency response suspension. The hydraulic buffer device 1 includes a cylinder section 10, a piston rod 20, a piston valve 30, a damping force adjusting section 40, and a bottom valve 60.

[Configuration and Functions of the Cylinder Section 10]

The cylinder section 10 includes a thin cylindrical outer cylinder 11, a thin cylindrical inner cylinder 12 housed in the outer cylinder 11, and a bottom lid 13 configured to close one end in a center axis direction (an up down direction in FIG. 2) of a cylinder of the cylindrical outer cylinder 11. In the following explanation, the center axis direction of the cylinder of the outer cylinder 11 is simply referred to as "axis direction". An end side on the lower side in the figure in the axis direction of the outer cylinder 11 is referred to as "one" and an end side on the upper side in the figure of the outer cylinder 11 is referred to as "the other".

The cylinder section 10 includes a rod guide 14 arranged on the inner side of the outer cylinder 11 and configured to guide the piston rod 20 and a bump stopper cap 15 configured to slide the piston rod 20 and attached to the other end in the axis direction in the outer cylinder 11. The cylinder section 10 includes an oil seal 16 provided on the inner side of the bump stopper cap 15 and on the opposite side of a piston 31 with respect to the rod guide 14 and configured to prevent a leak of the liquid in the cylinder section 10 and mixing of a foreign matter in the cylinder section 10.

In the cylinder section 10, the length in the axis direction in the outer cylinder 11 is larger than the length of the inner cylinder 12. The inner cylinder 12 is arranged concentrically with the outer cylinder 11. That is, one end in the axis direction in the inner cylinder 12 is supported by one end in the axis direction in the outer cylinder 11 via a valve body 61 explained below, which is one of components configuring the bottom valve 60, and the bottom lid 13.

On the other hand, the other end in the axis direction in the inner cylinder 12 is supported by the rod guide 14. Consequently, the inner cylinder 12 is concentrically arranged with the outer cylinder 11 such that a space between the outer circumference of the inner cylinder 12 and the inner circumference of the outer cylinder 11 are fixed in the axis direction. A reservoir chamber R is formed by the outer circumferential surface of the inner cylinder 12 and the inner circumferential surface of the outer cylinder 11. As shown in FIG. 2, a valve body 61 explained below of the bottom valve 60 divides a first oil chamber Y1 and the reservoir chamber R.

[Configuration and Functions of the Piston Rod 20]

The piston rod 20 extends in the axis direction and is connected to the piston valve 30 and the damping force adjusting section 40 at one end in the axis direction.

The piston rod 20 is a solid or hollow bar-like member and includes a columnar or cylindrical rod section 21, a one-side attaching section 22a at one end in the axis direction for attaching the piston valve 30, the damping force adjusting section 40, and the like, and an other-side attaching section 22b at the other end in the axis direction for attaching the piston rod 20 to a vehicle body or the like. Spiral grooves are cut and external threads are formed on the outer surfaces at ends of the one-side attaching section 22a and the other-side attaching section 22b. The one-side attaching section 22a and the other-side attaching section 22b function as bolts.

The one-side attaching section 22a has a small outer diameter compared with the rod section 21. Therefore, the one-side attaching section 22a forms a step 23 at a connecting point to the rod section 21. Further, the piston rod 20 includes, in the one-side attaching section 22a, a bypass path 25, which is a path for oil formed to extend in the axis direction and is an example of a channel section for circulating the oil between the second oil chamber Y2 and the first oil chamber Y1.

As shown in FIGS. 3A to 3C, the bypass path 25 is formed by so-called D cutting for forming the cross section of a part of the one-side attaching section 22a in a D shape. In the bypass path 25, channels of the oil are formed by spaces formed between the bypass path 25 and holes, through which the one-side attaching section 22a is inserted, respectively formed in an opening section 351H of a first valve stopper 351, a second valve stopper 352, a second valve group 322, the piston 31, a first valve group 321, a third valve stopper 353, and a damping force variable valve 41 explained below.

Further, the one-side attaching section 22a includes a first reduced diameter section a1 and a second reduced diameter section a2 formed at a smaller external diameter compared with the other portions. The first reduced diameter section a1 is formed in a position opposed to the opening section 351H of the first valve stopper 351 explained below. The second reduced diameter section a2 is formed in a position opposed to a communication path 37 of the third valve stopper 353 explained below.

[Configuration and Functions of the Piston Valve 30]

The piston valve 30 includes, as shown in FIG. 3A, the piston 31, which is an example of a portioning member, the first valve group 321 configured to close one end in the axis direction in a part of a plurality of oil paths formed in the piston 31, and a second valve group 322 configured to close the other end in the axis direction in a part of the plurality of oil paths formed in the piston 31. Further, the piston valve 30 includes the first valve stopper 351, the second valve stopper 352, and the third valve stopper 353.

The piston 31 is a columnar member including the plurality of oil paths formed in the axis direction. The piston 31 is set in contact with the inner circumferential surface of the inner cylinder 12 via a seal member provided on the outer circumferential surface of the piston 31 and divides a space, in which liquid (the oil in this embodiment) is encapsulated, in the inner cylinder 12 into the first oil chamber Y1 further on the one end side in the axis direction than the piston 31 and the second oil chamber Y2 further on the other end side in the axis direction than the piston 31 (see FIG. 2).

In the piston 31, an attachment hole 31R formed in the axis direction in order to insert the one-side attaching section 22a of the piston rod 20 therethrough, a first oil path 341 formed in the axis direction in a region further on the outer side in the radial direction than the attachment hole 31R, and a second oil path 342 formed in the axis direction in a region further on the outer side in the radial direction than the first oil path 341 are formed. A plurality of (four in this embodiment) first oil paths 341 and second oil paths 342 are formed at an equal interval in the circumferential direction and allow the first oil chamber Y1 and the second oil chamber Y2 to communicate with each other.

The first valve group 321 is configured by laying a plurality of disc-like members, in which bolt holes for inserting the one-side attaching section 22a of the piston rod 20 are formed, one on top of another. Respective valves configuring the first valve group 321 are set to close the first oil paths 341 and open the second oil paths 342.

The second valve group 322 is configured by laying a plurality of disc-like members, in which bolt holes for inserting the one-side attaching section 22a of the piston rod 20 are formed, one on top of another. Respective valves configuring the second valve group 322 are set to close the second oil paths 342 and open the first oil paths 341.

The first valve stopper 351 and the second valve stopper 352 are respectively generally formed in columnar shapes. The first valve stopper 351 and the second valve stopper 352 respectively include an attachment hole 351R and an attachment hole 352R extending in the axis direction and having an inner diameter through which the one-side attaching section 22a of the piston rod 20 can pierce. Further, the first valve stopper 351 has an opening section 351H formed adjacent to the attachment hole 351R and pierced in the axis direction.

In the first valve stopper 351 and the second valve stopper 352, the one-side attaching section 22a is fit in the attachment hole 351R. The second valve group 322 is sandwiched between the first and second valve stoppers 351 and 352 and the piston 31.

One end side in the axis direction of the opening section 35111 of the first valve stopper 351 is opened to the second oil chamber Y2. The other side faces the bypass path 25 formed in the piston rod 20 located on the inner side of the second valve stopper 352. The opening section 351H functions as an outflow and inflow section of a flow of the oil flowing via the bypass path 25.

The first valve stopper 351 rotates around the piston rod 20 according to, for example, an extending and compressing action of the hydraulic buffer device 1. In this case, since the first reduced diameter section a1 is formed in the circumferential direction, it is possible to feed the oil from the opening section 351H to the bypass path 25 via the first reduced diameter section a1 irrespective of what rotating angle the opening section 351H of the first valve stopper 351 has.

The third valve stopper 353 is generally formed in a columnar shape. The third valve stopper 353 includes an attachment hole 353R extending in the axis direction and having an inner diameter through which the one-side attaching section 22a of the piston rod 20 can pierce. Further, the third valve stopper 353 includes an annular recess 36, which is an example of a second space forming section, opposed to the damping force variable valve 41 explained below and a communication path 37, which is an example of a second inflow section, that forms a channel of the oil between the annular recess 36 and the bypass path 25.

The one-side attaching section 22a is fit in the attachment hole 353R, whereby the third valve stopper 353 is held by the piston rod 20. In a state in which the third valve stopper 353 is attached to the piston rod 20, the third valve stopper 353 sandwiches the first valve group 321 between the third valve stopper 353 and the piston 31.

The annular recess 36 is a recess formed in an annular shape provided at an end on a side opposed to the damping force variable valve 41 in the third valve stopper 353. As shown in FIGS. 3A to 3C, the annular recess 36 is formed by double annular recesses. The annular recesses forming the annular recess 36 are connected to each other to allow the oil to pass. The damping force variable valve 41 is arranged to be opposed to the annular recess 36. Further, the oil flows into the annular recess 36 from the communication path 37, whereby the damping force variable valve 41 is pressed with the pressure of the oil.

The communication path 37 is a conduit circular in section formed by boring the third valve stopper 353. The communication path 37 is a circular conduit, an opening at one end of which is formed in the attachment hole 353R and an opening at the other end of which is provided in the annular recess 36. The communication path 37 is formed obliquely to the axis direction from the attachment hole 353R to the annular recess 36 side. The communication path 37 forms a channel of the flow of the oil between the bypass path 25 and the annular recess 36. In this embodiment, the communication path 37 is obliquely formed to allow the oil to easily flow from the bypass path 25 into the communication path 37.

A channel sectional area of the oil in the communication path 37 is set smaller than a channel sectional area of the bypass path 25 and set larger than a channel sectional area of a slit 42S of a slit valve 42 explained below. In the following explanation in this embodiment, the channel sectional area of the bypass path 25 is defined as a channel sectional area in a narrowest portion of the piston 31 in the channel of the oil configuring the bypass path 25.

The third valve stopper 353 rotates around the piston rod 20 according to, for example, the expanding and compressing action of the hydraulic buffer device 1. In this case, since the second reduced diameter section a2 is formed in the circumferential direction, it is possible to receive the oil flowing through the bypass path 25 in the communication path 37 via the second reduced diameter section a2 irrespective of what rotating angle the communication path 37 of the third valve stopper 353 has.

[Configuration and Functions of the Damping Force Adjusting Section 40]

As shown in FIG. 3A, the damping force adjusting section 40 includes a damping force variable valve 41, which is an example of a releasing and blocking section, a slit valve 42, which is an example of a first inflow section, a piston nut 43, a spool 44, and a supporting spring 46. Further, the damping force adjusting section 40 includes an end cap 51, a float valve 52, and a pressure adjustment chamber spring 53.

The damping force variable valve 41 is a disc-like member and formed larger than the outer diameter at the edge on the outer side of the annular recess 36. The damping force variable valve 41 is attached to cover the annular recess 36 of the third valve stopper 353. The damping force variable valve 41 is deformed as explained below to form a state in which the damping force variable valve 41 covers the entire annular recess 36 and a state in which at least a part of the damping force variable valve 41 is separated from the annular recess 36.

In the state in which the damping force variable valve 41 covers the annular recess 36, the damping force variable valve 41 limits a flow of the oil flowing from the second oil chamber Y2 to the first oil chamber Y1 side via the bypass path 25. On the other hand, in the state in which at least a part of the damping force variable valve 41 is separated from the annular recess 36, the damping force variable valve 41 feeds the oil from the second oil chamber Y2 to the first oil chamber Y1 side via the bypass path 25. In this way, the damping force variable valve 41 functions as a releasing and blocking mechanism for the flow of the oil flowing from the second oil chamber Y2 to the first oil chamber Y1 side via the bypass path 25.

As shown in FIG. 3B, the slit valve 42 is a disk-like member. The slit valve 42 includes an opening section 42H in the center through which the one-side attaching section 22a of the piston rod 20 pierces and a slit 42S (in this embodiment, slits 42S are formed in two places in the circumferential direction) cut in positions closer to the outer circumference outward in the radial direction than the inner circumference surface of an annular section 42C that surrounds the opening section 42H. In this embodiment, a channel sectional area of the slit 42S is set smaller than a channel sectional area of the bypass path 25 and the communication path 37. When the slit valve 42 has a plurality of slits 42S, a sum of channel sectional areas of the plurality of slits 42S only has to be smaller than the channel sectional area of the bypass path 25 and the communication path 37.

The slit valve 42 is sandwiched and held between the end on the first oil chamber Y1 side (one side) of the third valve stopper 353 and an annular projecting section 432 (explained below) of the piston nut 43 together with the damping force variable valve 41. At this point, the distal end side of the slit 42S extends outward in the radial direction thereof beyond the annular projecting section 432 (explained below) and communicates with a pressure chamber 47 explained below. The proximal end side of the slit 42S communicates with the lower end of the bypass path 25. In this way, the slit 42S forms a channel of the oil from the bypass path 25 to the pressure chamber 47.

The piston nut 43 includes a columnar section 431, an annular projecting section 432 provided on one end side in the axis direction of the columnar section 431, and a cylindrical section 433 provided on the other end side.

The columnar section 431 includes a bolt hole 43R, which is a through-hole, extending in the axis direction and in which the one-side attaching section 22a of the piston rod 20 is fit and a communication passage 43H adjacent to the bolt hole 43R and formed to pierce through the columnar section 431 from the annular projecting section 432 side to the cylindrical section 433 in the axis direction. In this embodiment, a plurality of communication passages 43H are provided in the circumferential direction of the piston nut 43.

The one-side attaching section 22a is fixed to the bolt hole 43R, whereby the piston nut 43 is supported by the piston rod 20. In this embodiment, the bolt hole 43R of the piston nut 43 is attached to the one-side attaching section 22a. Consequently, the piston nut 43 sandwiches the members, which are sandwiched between the piston nut 43 and the step 23 of the piston rod 20, such as the piston valve 30 and the damping force adjusting section 40 between the piston nut 43 and the step 23 and causes the piston rod 20 to hold these members.

The communication passages 43H allow the pressure chamber 47 and a pressure adjustment chamber 55 explained later to communicate and form a channel of the oil between the pressure chamber 47 and the pressure adjustment chamber 55.

One channel of the oil is formed between the second oil chamber Y2 and the first oil chamber Y1 by the bypass path 25 of the piston rod 20, the pressure chamber 47, the communication passages 43H, the cylindrical section 433 (the pressure adjustment chamber 55), and a through-hole 51H (explained below) of the end cap 51. In this channel, as explained below, the oil flows according to the action of the piston valve 30.

The spool 44 is generally formed in a cylindrical shape. The spool 44 includes a flange-like upper end 44a bent in a direction orthogonal to the axis direction in an opening section on one end side. The other end side is fit in the outer side of the columnar section 431 of the piston nut 43. An O ring 45 is provided between the spool 44 and the columnar section 431. The spool 44 is attached movably in the axis direction with respect to the columnar section 431 of the piston nut 43.

The upper end 44a of the spool 44 is formed to be capable of coming into contact with the damping force variable valve 41 on one end side in the axis direction and formed to come into contact with the supporting spring 46 on the other end side. The spool 44 is urged toward the third valve stopper 353 by the supporting spring 46 and presses the damping force variable valve 41 against the annular recess 36 of the third valve stopper 353.

As shown in FIG. 3A, the pressure chamber 47, which is an example of a first space forming section, is formed by a space surrounded by the upper end 44a of the spool 44, the annular projecting section 432 of the piston nut 43, and the damping force variable valve 41. The pressure chamber 47 is provided on the opposite side of a side where the annular recess 36 of the damping force variable valve 41 is arranged, whereby the pressure chamber 47 is opposed to the damping force variable valve 41. The pressure chamber 47 presses the damping force variable valve 41 together with the spool 44 with the pressure of the oil flowing into the pressure chamber 47 from the bypass path 25 via the slit valve 42.

As shown in FIG. 3C, the supporting spring 46 has a ring shape. A plurality of projecting sections 46a projecting to the outer side in the radial direction in the outer circumferential section of the supporting spring 46 are formed. The supporting spring 46 is supported by the annular projecting section 432 of the piston nut 43 in the inner circumferential section of the supporting spring 46. As shown in FIG. 3A, the supporting spring 46 brings the projecting sections 46a into contact with the upper end 44a of the spool 44 and holds the spool 44 to be movable in the axis direction.

Figure 4:
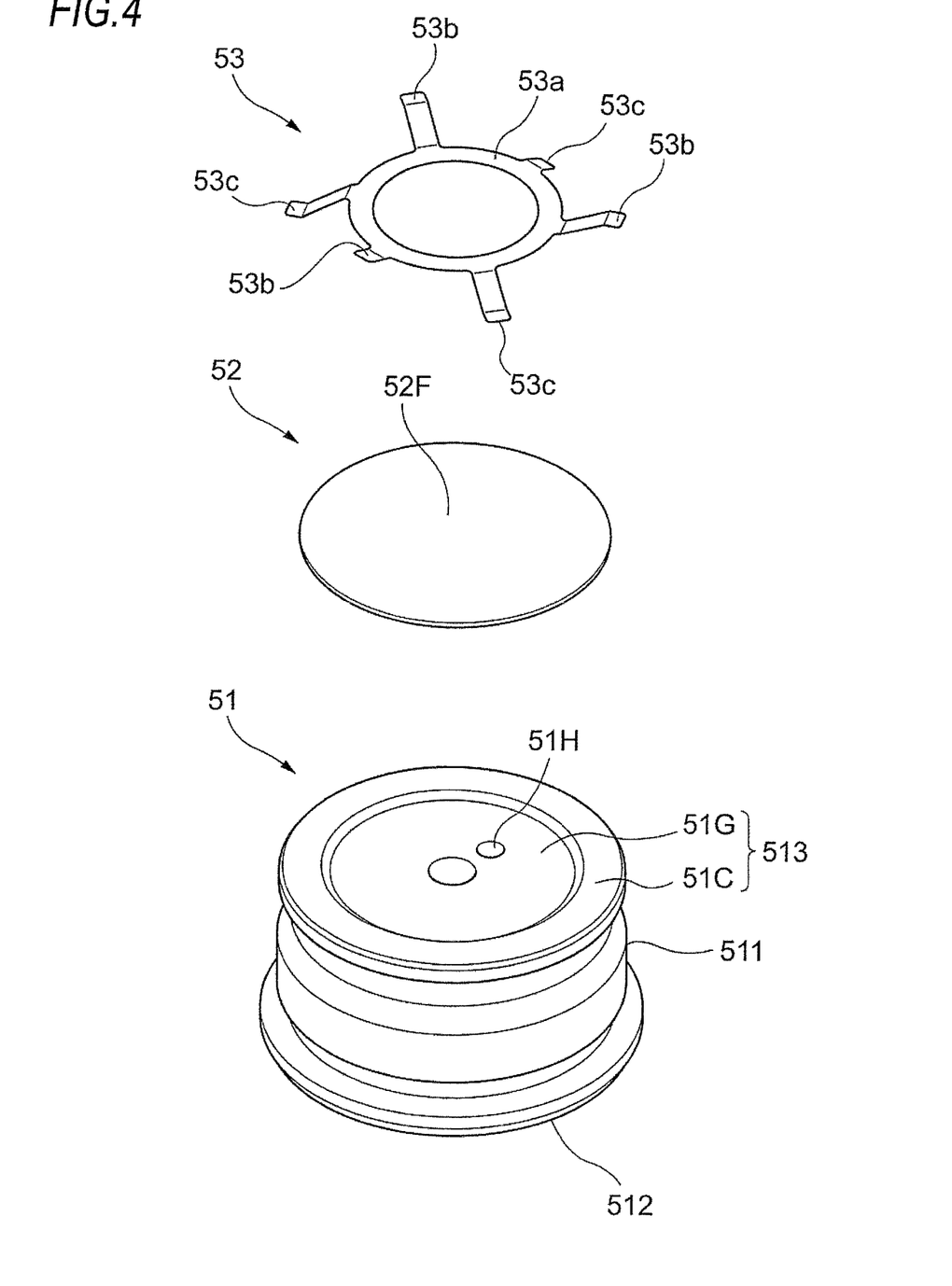
FIG. 4 is a diagram for explaining a damping force adjusting section.

FIG. 4 is a diagram for explaining the damping force adjusting section 40.

As shown in FIG. 4, the end cap 51 is a member generally having a bottomed cylindrical shape. The end cap 51 includes a side surface section 511, a one-side end 512, and an other-side end 513.

The outer diameter of the side surface section 511 of the end cap 51 is set to the same degree as the inner diameter of the cylindrical section 433 of the piston nut 43. The end cap 51 is fit in the inner side of the cylindrical section 433 of the piston nut 43. At this point, a screw (not shown in the figure) formed in the outer circumference of the side surface section 511 and a screw (not shown in the figure) formed in the inner circumference of the cylindrical section 433 are fit with each other and fixed.

In a state in which the end cap 51 is fit in the inner side of the cylindrical section 433 of the piston nut 43, the end cap 51 forms the pressure adjustment chamber 55, which is a space, between the other-side end 513 and the cylindrical section 433. As shown in FIG. 3A, the float valve 52 and the pressure adjustment chamber spring 53 are housed in the pressure adjustment chamber 55.

As shown in FIG. 4, the other-side end 513 of the end cap 51 includes an annular section 51C formed along the edge of a circle and projecting in the axis direction and a deformation regulating section 51G including a step-like recess provided further on the inner side in the radial direction than the annular section 51C and lower than the annular section 51C in the axis direction.

The annular section 51C sandwiches the outer edge of the float valve 52 between the annular section 51C and the pressure adjustment chamber spring 53 explained below. The deformation regulating section 51G forms a space for allowing, when the float valve 52 is bent and deformed, an amount of the deformation within a predetermined range.

Further, the end cap 51 includes a through-hole 51H that pierces through the end cap 51 from the other-side end 513 to the one-side end 512. One side of the through-hole 51H communicates with the pressure adjustment chamber 55 and the other side faces the first oil chamber Y1 (see FIG. 3A).

As shown in FIG. 4, the float valve 52 is a leaf spring having a disk shape. The float valve 52 includes, in the center, an elastic bending section 52F that bends in a curved shape with the pressure of the oil.

The outer circumferential section of the float valve 52 is urged toward the annular section 51C of the end cap 51 by the pressure adjustment chamber spring 53. The float valve 52 can move against the urging force of the pressure adjustment chamber spring 53 explained below. The float valve 52 is displaced in the axis direction and a direction orthogonal to the axis direction. Further, by receiving a pressure while coming into contact with the annular section 51C of the end cap 51, the float valve 52 is deformed until the elastic bending section 52F in the center comes into contact with the deformation regulating section 51G.

As explained above, the float valve 52 is deformed and displaced during an extension stroke and a compression stroke to change the capacity of the pressure adjustment chamber 55. The float valve 52 closes the through-hole 51H of the end cap 51 to thereby block and release the flow of the oil between the pressure adjustment chamber 55 and the first oil chamber Y1 side.

As shown in FIG. 4, the pressure adjustment chamber spring 53 is a thin annular spring and includes a plate-like annular section 53a and a plurality of upward spring legs 53b and downward spring legs 53c radially provided in the outer circumference of the plate-like annular section 53a. The upward spring legs 53b and the downward spring legs 53c are provided at a fixed interval in the circumferential direction of the plate-like annular section 53a. Further, the upward spring legs 53b and the downward spring legs 53c are alternately arranged side by side in an oblique upward direction and an oblique downward direction in the outer circumference of the plate-like annular section 53a.

The pressure adjustment chamber spring 53 is attached with the upward spring legs 53b opposed to the end surface of the cylindrical section 433 of the piston nut 43 and supports the float valve 52 to be pressed toward the annular section 51C of the end cap 51 by the downward spring leg 53c.

[Configuration and Functions of the Bottom Valve 60]

As shown in FIG. 2, the bottom valve 60 includes a valve body 61 including a plurality of oil paths formed in the axis direction, a first valve 621 configured to close one ends in the axis direction in a part of the plurality of oil paths formed in the valve body 61, a second valve 622 configured to close the other ends in the axis direction in a part of the plurality of oil paths formed in the valve body 61, and a bolt 60B for fixing these members.

The valve body 61 includes a disc-like section 63 having a disc shape and a cylindrical section 64 having a cylindrical shape extending in the axis direction from the outermost portion in the radial direction of the disc-like section 63. The valve body 61 divides a closed space in the cylinder section 10.

In the disc-like section 63, a bolt hole 65R formed in the axis direction to allow a shaft section of the bolt 60B to pass, a first oil path 661 formed in the axis direction in a region further on the outer side in the radial direction than the bolt hole 65R, and a second oil path 662 formed in the axis direction in a region further on the outer side in the radial direction than the first oil path 661 are formed. A plurality of (four in this embodiment) first oil paths 661 and second oil paths 662 are formed at an equal interval in the circumferential direction. The first oil paths 661 and the second oil paths 662 function as communication paths that allow the first oil chamber Y1 and the reservoir chamber R to communicate with each other.

The cylindrical section 64 includes a plurality of (four in this embodiment) recesses 64a, which are recessed from an end face to one end side in the axis direction, at an equal interval in the circumferential direction. The inside of the cylindrical section 64 and the reservoir chamber R are allowed to communicate with each other by the recess 64a.

The first valve 621 is a member having a disc shape in which a bolt hole for inserting the shaft section of the bolt 60B is formed. The outer diameter of the first valve 621 is set to a size for closing the first oil paths 661 and a size for opening the second oil path 662.

The second valve 622 is a member having a disc shape in which a bolt hole for inserting the shaft section of the bolt 60B is formed. The outer diameter of the second valve 622 is set to a size for closing the second oil path 662. In the second valve 622, a plurality of (nine in this embodiment) oil holes are formed in positions corresponding to the first oil paths 661 viewed from the center in the radial direction at an equal interval in the circumferential direction.

The operation of the hydraulic buffer device 1 according to this embodiment is explained.

First, the actions of the piston valve 30 and the bottom valve 60 during the compression stroke and during the extension stroke are explained.

Figure 5:
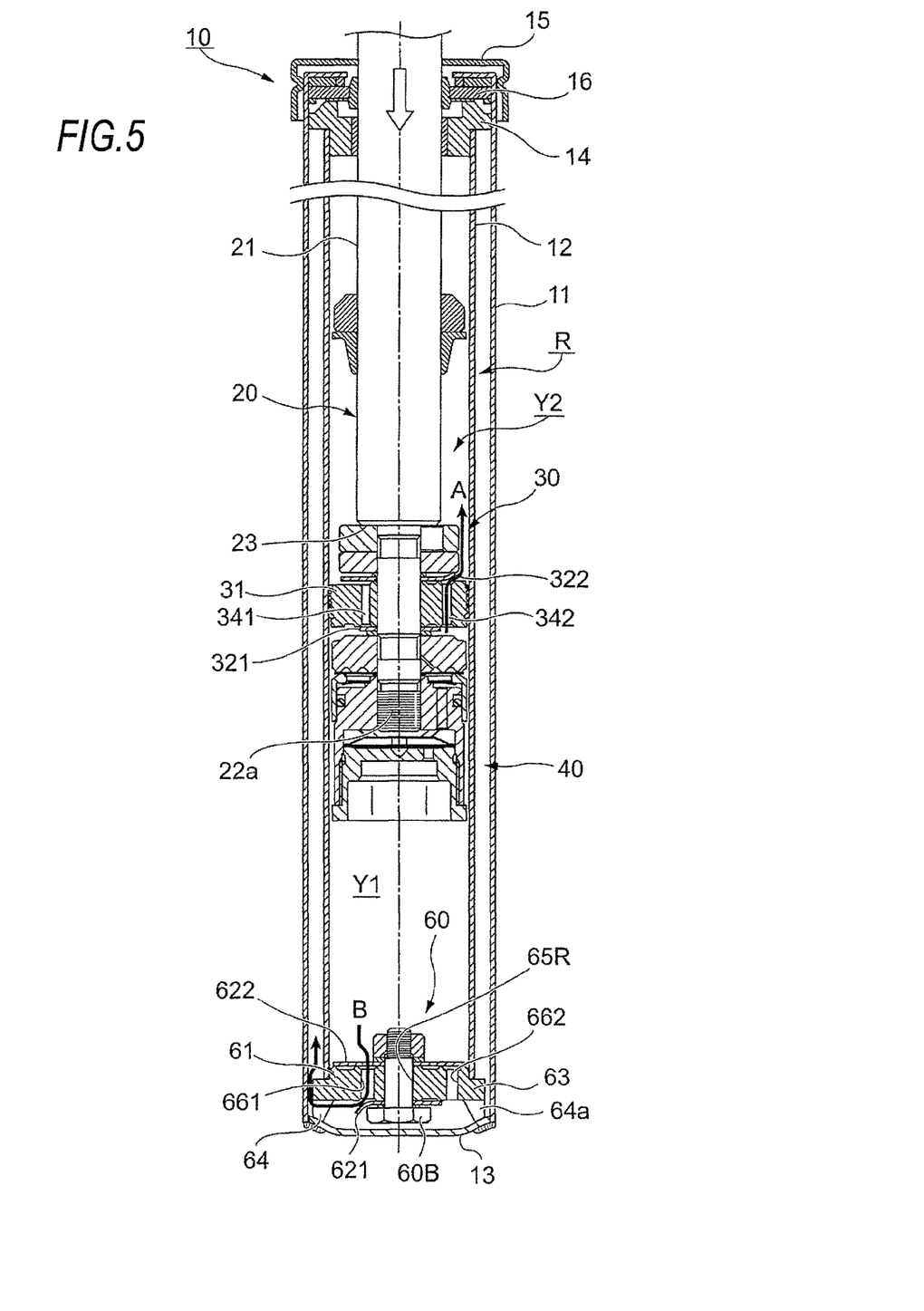
FIG. 5 is a diagram showing a flow of oil during a compression stroke.

FIG. 5 is a diagram showing a flow of the oil during the compression stroke.

As shown in FIG. 5, when the piston 31 moves to one end side (downward in FIG. 5) in the axis direction with respect to the cylinder section 10 as indicated by a white arrow, the oil in the first oil chamber Y1 is pushed by the movement of the piston 31, the pressure on the lower side of the piston valve 30 rises, and a high pressure acts on the second oil paths 342 of the piston valve 30. As a result, the second valve group 322 that closes the second oil paths 342 opens. The oil flows into the second oil chamber Y2 above the piston valve 30 through the second oil paths 342 as indicated by an arrow A in FIG. 5. The flow of the oil from the first oil chamber Y1 to the second oil chamber Y2 is squeezed by the second valve group 322 and the second oil paths 342 to provide a damping force during the compression stroke of the hydraulic buffer device 1.

The pressure in the first oil chamber Y1 risen according to the movement of the piston 31 in the one end side in the axis direction acts on the first oil paths 661 of the bottom valve 60 and opens the first valve 621 that closes the first oil paths 661. The oil in the first oil chamber Y1 flows into the reservoir chamber R formed between the inner cylinder 12 and the outer cylinder 11 through the first oil paths 661 and the recess 64a of the valve body 61 as indicated by an arrow B in FIG. 5. The flow of the oil from the first oil chamber Y1 to the reservoir chamber R is squeezed by the first valve 621 and the first oil paths 661 to provide a damping force during the compression stroke of the hydraulic buffer device 1.

Figure 6:
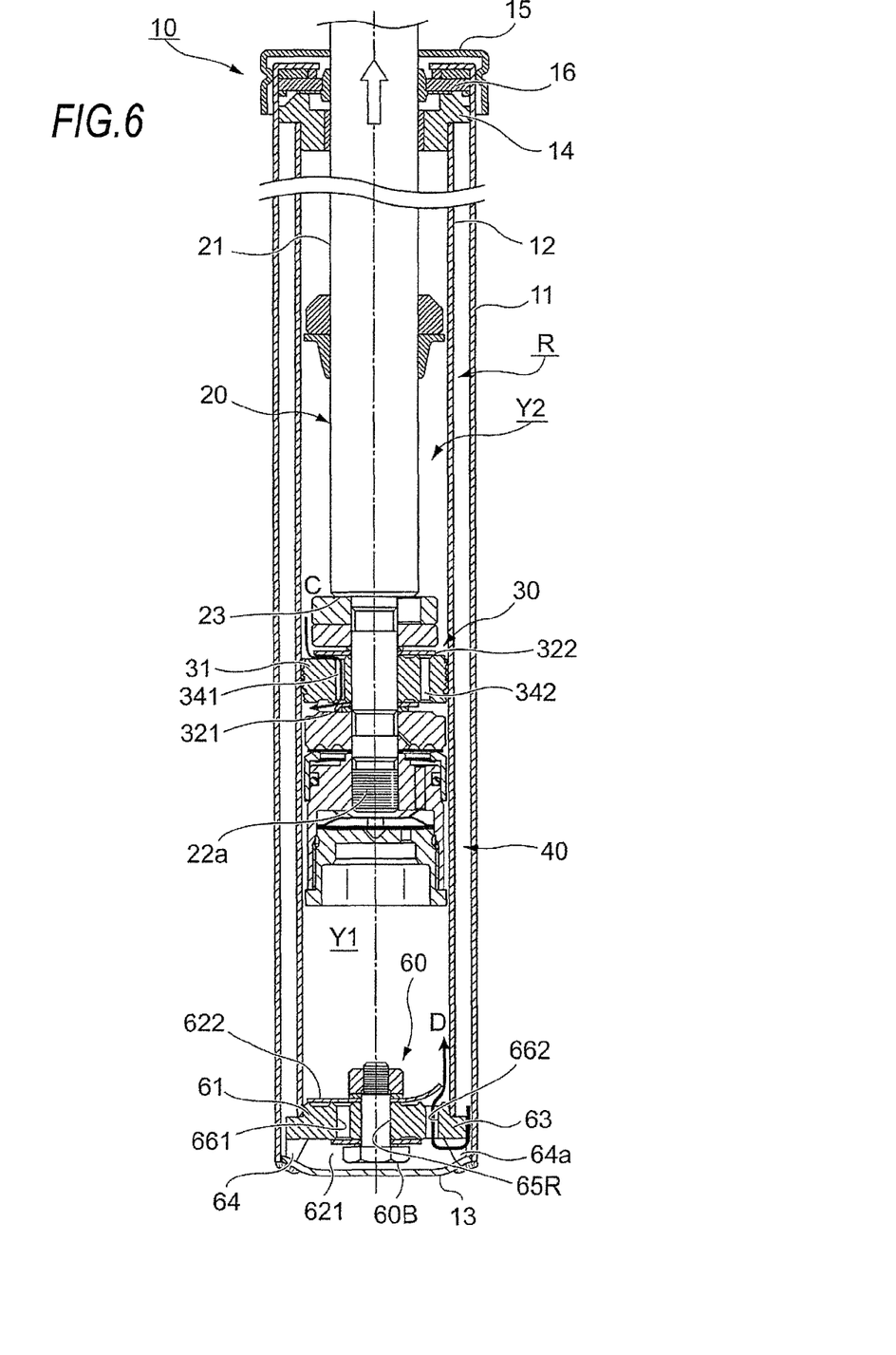
FIG. 6 is a diagram showing a flow of the oil during an extension stroke.

FIG. 6 is a diagram showing a flow of the oil during the extension stroke.

As shown in FIG. 6, when the piston 31 moves to the other end side (upward in FIG. 6) in the axis direction with respect to the cylinder section 10 as indicated by a white arrow, the oil is in short supply in the first oil chamber Y1 by the volume of the piston 31 and the first oil chamber Y1 has a negative pressure. Consequently, the oil in the second oil chamber Y2 passes through the first oil paths 341 of the piston valve 30, opens the first valve group 321 that closes the first oil paths 341, and flows into the first oil chamber Y1 as indicated by an arrow C in FIG. 6. The flow of the oil from the second oil chamber Y2 to the first oil chamber Y1 is squeezed by the first valve group 321 and the first oil paths 341 of the piston valve 30 to provide a damping force during the extension stroke of the hydraulic buffer device 1.

When the piston 31 moves in the direction of the white arrow in FIG. 6, the oil in the reservoir chamber R passes through the recess 64a and the second oil paths 662 of the valve body 61 of the bottom valve 60, opens the second valve 622 that closes the second oil path 662, and flows into the first oil chamber Y1 as indicated by an arrow D in FIG. 6. The flow of the oil from the reservoir chamber R to the first oil chamber Y1 is squeezed by the second valve 622 and the second oil paths 662 of the bottom valve 60 to provide a damping force during the extension stroke of the hydraulic buffer device 1.

The operation of the damping force adjusting section 40 is explained.

Figure 7:
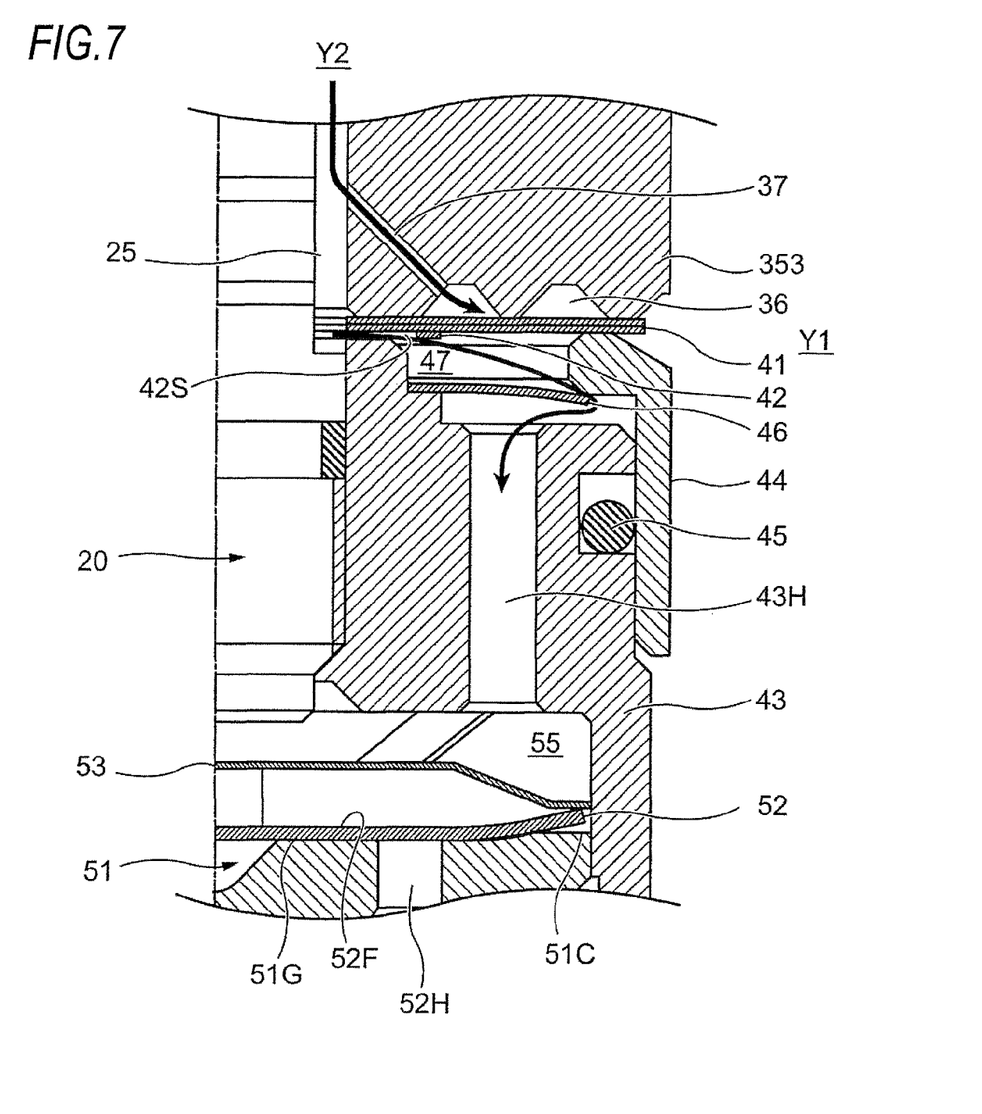
FIG. 7 is a diagram for explaining the operation of the damping force adjusting section during an extension stroke in a low-frequency range.

FIG. 7 is a diagram for explaining the operation of the damping force adjusting section 40 during an extension stroke in a low-frequency range.

In the extension stroke in the low-frequency range, when the piston 31 moves, the pressure in the second oil chamber Y2 rises (see FIG. 2). At this point, the oil flows into the bypass path 25 from the opening section 351H of the first valve stopper 351 facing the second oil chamber Y2. As shown in FIG. 7, the flow of the oil in the bypass path 25 reaches the communication path 37 and the slits 42S of the slit valve 42. At this point, the flow of the oil is quickly transmitted to the annular recess 36 and the pressure chamber 47 without being squeezed by the communication path 37 and the slits 42S. The pressure adjustment chamber 55 communicates with the pressure chamber 47 via the communication passages 43H. Therefore, the float valve 52 is pushed in, the pressure adjustment chamber 55 has the same pressure as the pressure chamber 47, and a liquid pressure drop in the pressure chamber 47 is not caused. Therefore, the pressure of the oil in the annular recess 36 and the pressure chamber 47 is the same as the pressure in the second oil chamber Y2. As a result, the damping force variable valve 41 in the damping force adjusting section 40 is closed.

As explained above, in the low-frequency range, the flow of the oil flowing via the bypass path 25 is hardly formed. Therefore, the oil flows from the second oil chamber Y2 to the first oil chamber Y1 through only a moving route via the piston valve 30 (see FIG. 6). A state of a high damping force is formed in the hydraulic buffer device 1.

Figure 8:
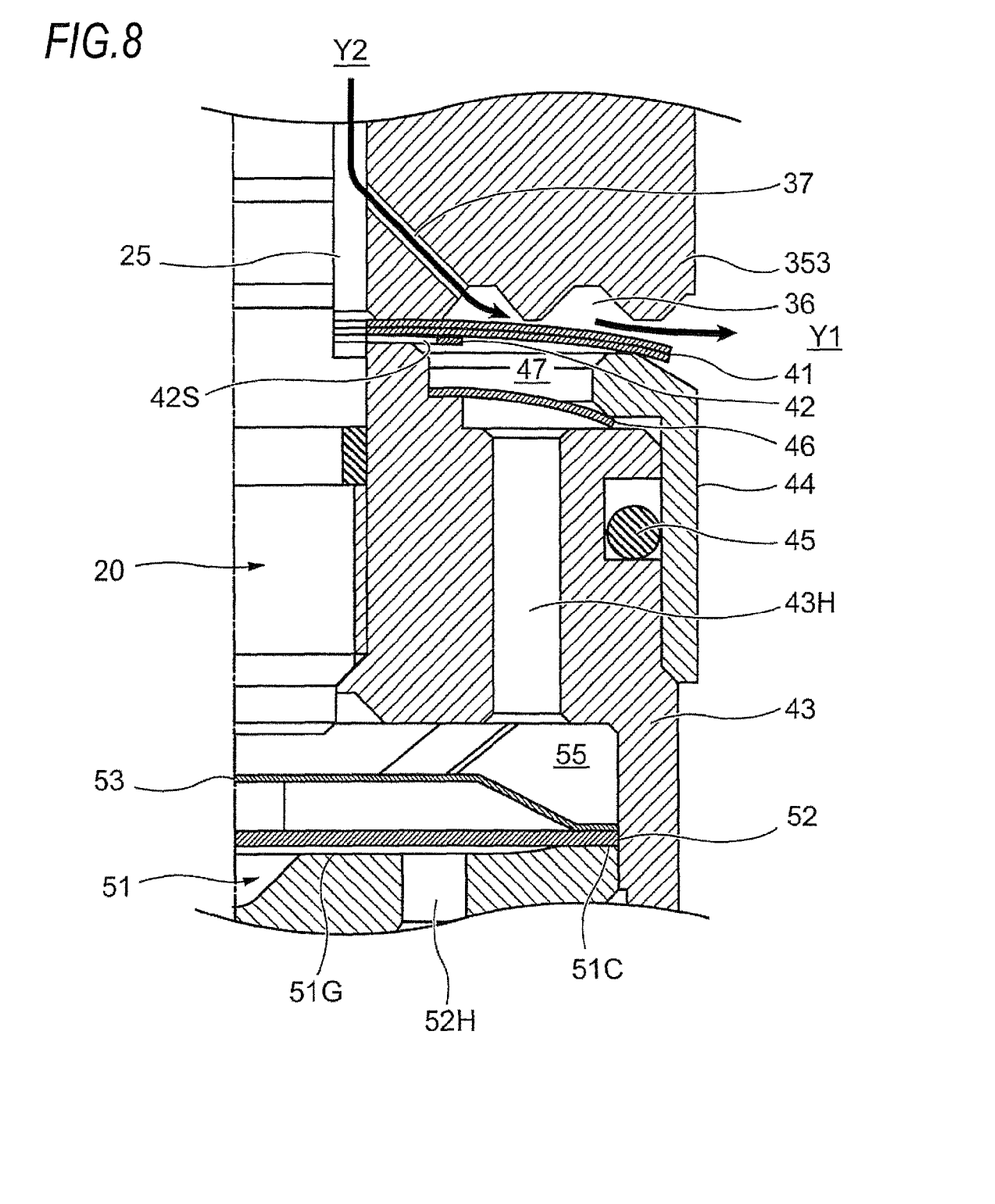
FIG. 8 is a diagram for explaining the operation of the damping force adjusting section during an extension stroke in a high-frequency range.

FIG. 8 is a diagram for explaining the operation of the damping force adjusting section during an extension stroke in a high-frequency range.

During the extension stroke in the high-frequency range, when the piston 31 moves, the pressure in the second oil chamber Y2 rises (see FIG. 2). In a range of very small amplitude in which the piston 31 starts to move, as shown in FIG. 8, the flow of the oil in the bypass path 25 is transmitted to the pressure chamber 47 while being delayed by the slits 42S of the slit valve 42 provided on the channel of the oil via the bypass path 25. Therefore, the pressure of the oil in the pressure chamber 47 less easily rises.

On the other hand, the flow of the oil in the bypass path 25 reaches the communication path 37. Since the communication path 37 has a channel cross section larger than a channel cross section of the slits 42S of the slit valve 42, the oil more easily flows through the communication path 37 than through the route via the slit valve 42. The oil flows into the annular recess 36 via the communication path 37. The pressure in the annular recess 36 rises.

Since the pressure of the oil in the pressure chamber 47 is lower than the pressure in the annular recess 36, a difference in pressure occurs between the pressure chamber 47 and the annular recess 36. With this pressure difference, as shown in FIG. 8, the damping force variable valve 41 is pushed to open together with the spool 44 and causes the flow of the oil from the second oil chamber Y2 to the first oil chamber Y1 side flowing via the bypass path 25.

As a result, the pressure of the oil in the second oil chamber Y2 escapes to the first oil chamber Y1. Two channels of the oil in total via the bypass path 25 and the damping force variable valve 41 in addition to the second oil paths 342 and the second valve group 322 of the piston valve 30 are formed. Consequently, the damping force in the hydraulic buffer device 1 decreases.

The pressure of the oil in the pressure chamber 47 that drops because of the delay in the pressure transmission due to the slit valve 42 is thereafter about to rise. At this point, the float valve 52 of the pressure adjustment chamber 55 is pushed down and the capacity of the pressure chamber 47 increases. Therefore, a liquid pressure rise of the pressure chamber 47 is delayed. The delay is maintained until the float valve 52 comes into contact with the deformation regulating section 51G of the end cap 51.

As explained above, for example, in the range of the very small amplitude at the high frequency, a state in which the damping force of the hydraulic buffer device 1 is low is formed and riding comfort is improved.

Further, thereafter, when the elastic bending section 52F of the float valve 52 comes into contact with the deformation regulating section 51G, the liquid pressure in the pressure chamber 47 rapidly rises and the pressure difference between the annular recess 36 and the pressure chamber 47 is eliminated. The spool 44 is pushed by the supporting spring 46 and the damping force variable valve 41 closes. Finally, the oil passes through only the moving route via the piston valve 30 and the damping force of the hydraulic buffer device 1 increases.

In this way, for example, when the amplitude of the piston rod 20 is large and the piston rod 20 suddenly moves in the high-frequency range, a state in which the damping force of the hydraulic buffer device 1 is high is formed.

In the hydraulic buffer device 1 according to this embodiment, the channel sectional area of the communication path 37 is set small compared with the channel sectional area of the bypass path 25. Therefore, when the oil flows into the communication path 37 from the bypass path 25, the pressure of the oil drops. The pressure in the annular recess 36 that receives the inflow of the oil from the communication path 37 also drops.

On the other hand, when the elastic bending section 52F of the float valve 52 comes into contact with the deformation regulating section 51G, the liquid pressure in the pressure chamber 47 rises according to the inflow of the oil via the bypass path 25. Therefore, after the elastic bending section 52F of the float valve 52 comes into contact with the deformation regulating section 51G, the pressure in the annular recess 36 is high with respect to the pressure chamber 47. In this embodiment, the spool 44 easily moves to the damping force variable valve 41 more quickly and the damping force variable valve 41 easily closes.

The configuration of the hydraulic buffer device 1 according to this embodiment and the configuration of a hydraulic buffer device in which the channel sectional area of the communication path 37 is hypothetically set larger than the channel sectional area of the bypass path 25 are compared and explained.

In the configuration in which the channel sectional area of the communication path 37 is hypothetically set larger than the channel sectional area of the bypass path 25, a pressure drop of the oil flowing into the communication path 37 via the bypass path 25 hardly occurs. Therefore, a state in which the pressure in the annular recess 36 connected to the communication path 37 is high is maintained. Therefore, in the configuration in which the channel sectional area of the communication path 37 is hypothetically set larger than the channel sectional area of the bypass path 25, the damping force variable valve 41 less easily closes compared with the hydraulic buffer device 1 applied with this embodiment.

On the other hand, in the hydraulic buffer device 1 applied with this embodiment, for example, when the piston rod 20 moves largely at high speed in the high-frequency range, the spool 44 easily moves and the damping force variable valve 41 is easily closed more quickly. Consequently, in the hydraulic buffer device 1 according to this embodiment, it is possible to improve responsiveness of a damping force in a situation in which the piston rod 20 suddenly extends such as a steep turn or a bad road.

Figure 9A:
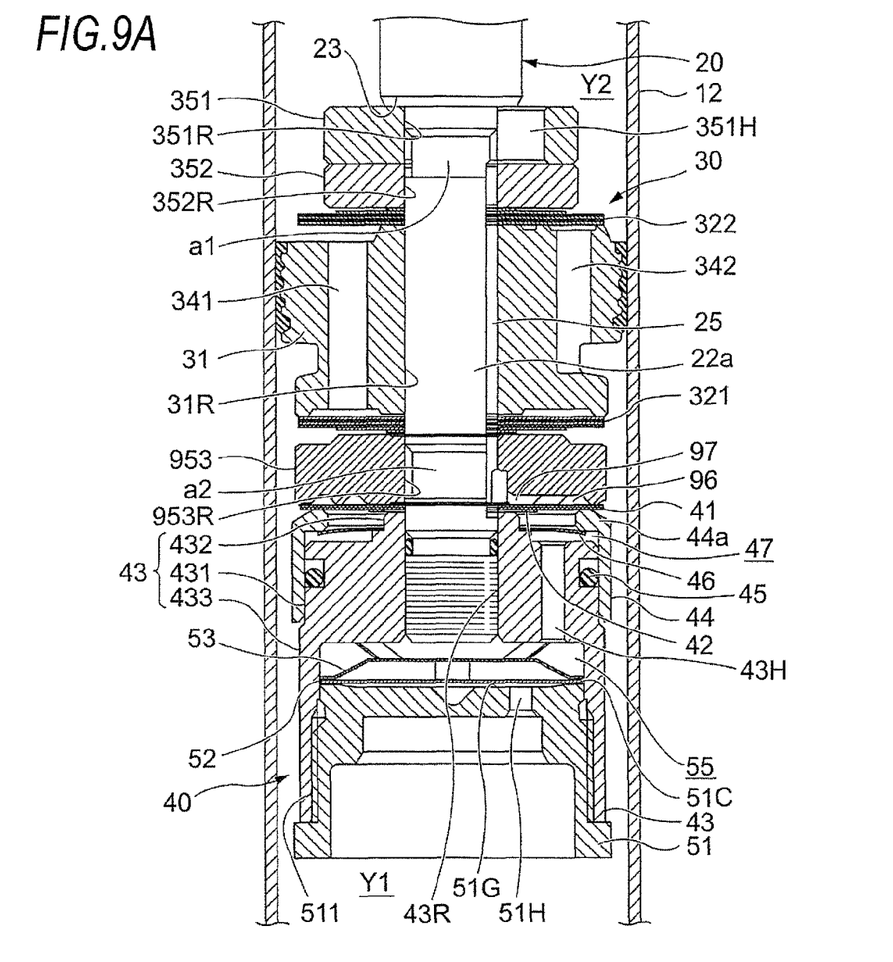
FIGS. 9A and 9B are diagrams for explaining a third valve stopper in another example.
Figure 9B:
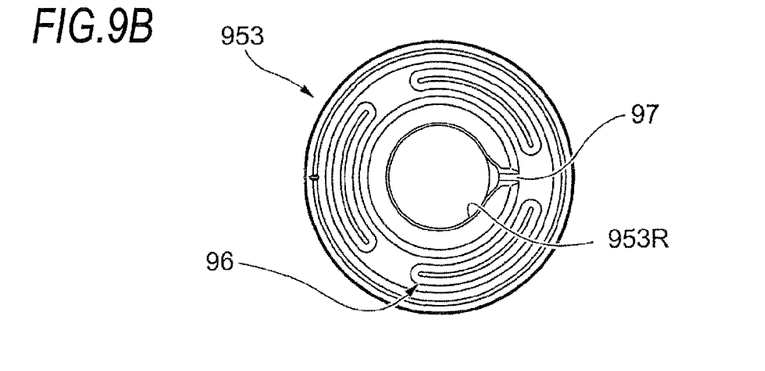

FIGS. 9A and 9B are diagrams for explaining a third valve stopper in a modification.

In FIG. 9A, the hydraulic buffer device 1 including a third valve stopper 953 in the modification is shown. FIG. 9B is a bottom view of the third valve stopper 953 in the modification viewed from a side (one side) where the damping force variable valve 41 is arranged.

As shown in FIGS. 9A and 9B, the third valve stopper 953 in the modification is generally formed in a columnar shape. The third valve stopper 953 includes an attachment hole 953R having an inner diameter extending in the axis direction through which the one-side attaching section 22a of the piston rod 20 can pierce. Further, the third valve stopper 953 includes an annular recess 96 provided to be opposed to the damping force variable valve 41 and a communication path 97 that forms a channel of the oil between the annular recess 96 and the bypass path 25.

As shown in FIG. 9A, the annular recess 96 is a recess formed in an annular shape provided at an end on a side opposed to the damping force variable valve 41 in the third valve stopper 953. As shown in FIGS. 9A and 9B, the annular recess 96 is formed by double recesses. The double annular recesses forming the annular recess 96 are connected to each other such that the oil can move between the recesses. The annular recess 96 presses the damping force variable valve 41 with the pressure of the oil flowing into the annular recess 96 from the communication path 97.

The communication path 97 is a cutout formed in the third valve stopper 953. As shown in FIG. 9B, the communication path 97 is formed to extend from the attachment hole 953R to the annular recess 96 in the radial direction. The communication path 97 forms a channel of a flow of the oil between the bypass path 25 and the annular recess 96. A channel sectional area of the oil in the communication path 97 is set larger than a channel sectional area of the slits 42S of the slit valve 42 and set smaller than a channel sectional area of bypass path 25.

In the hydraulic buffer device 1 including the third valve stopper 953 configured as explained above, by squeezing the flow of the oil flowing through the bypass path 25 using the communication path 97, when the piston rod 20 moves at high speed, it is possible to enable the damping force variable valve 41 to easily close more quickly and improve responsiveness of a damping force.

When the communication path 97 having the cutout shape is adopted as explained above, it is possible to attain simplification of a manufacturing process, for example, it is possible to form the communication path 97 simultaneously with, for example, the annular recess 96 through die cutting, cutting from one side, or the like.

Reference Signs List

1: Hydraulic buffer device, 10: Cylinder section, 20: Piston rod, 25: Bypass path, 30: Piston valve, 36: Annular recess, 37: Communication path, 40: Damping force adjusting section, 41: Damping force variable valve, 42: Slit valve, 44: Spool, 47: Pressure chamber, 60: Bottom valve

What is claimed is:

1. A pressure buffer device comprising:
a cylinder configured to store liquid;
a partitioning member configured to partition a space in the cylinder into a first liquid chamber and a second liquid chamber for storing the liquid;
a channel section configured to form a channel of the liquid from the second liquid chamber to the first liquid chamber;
a releasing and blocking section configured to release and block a flow of the liquid flowing from the second liquid chamber to the first liquid chamber via the channel section;
a first space forming section opposed to one side of the releasing and blocking section and configured to form a space for receiving inflow of the liquid;

a second space forming section opposed to the other side of the releasing and blocking section and configured to form a space for receiving inflow of the liquid;

a first inflow section connected to the channel section, configured to form an inflow route of the liquid from the channel section to the first space forming section, and having a channel sectional area smaller than a channel sectional area of the channel section; and a second inflow section connected to the channel section, configured to form an inflow route of the liquid from the channel section to the second space forming section, and having a channel sectional area larger than the channel sectional area of the first inflow section and smaller than the channel sectional area of the channel section.

2. The pressure buffer device according to claim 1, wherein the partitioning member includes a communication channel configured to allow the flow of the liquid between the first liquid chamber and the second liquid chamber, the pressure buffer device further comprises a rod member, which is a bar-like member, the rod member is configured to hold one end side of the partitioning member in an axis direction and move in the axis direction, and the channel section is formed in the rod member.

3. The pressure buffer device according to claim 1, further comprising:

an opposed member provided to be opposed to the releasing and blocking section, wherein the second inflow section is configured by a cutout provided in the opposed member and formed to connect the channel section and the second space forming section.

4. The pressure buffer device according to claim 1, further comprising:

an opposed member provided to be opposed to the releasing and blocking section, wherein the second inflow section is configured by a hole provided in the opposed member and formed to connect the channel section and the second space forming section.

5. A suspension device comprising:

a spring configured to reduce a vibration and a shock; and a pressure buffer device configured to damp a vibration by the spring, wherein the pressure buffer device includes:

a cylinder configured to store liquid;

a partitioning member configured to partition a space in the cylinder into a first liquid chamber and a second liquid chamber for storing the liquid;

a channel section configured to form a channel of the liquid from the second liquid chamber to the first liquid chamber;

a releasing and blocking section configured to release and block a flow of the liquid flowing from the second liquid chamber to the first liquid chamber via the channel section;

a first space forming section opposed to one side of the releasing and blocking section and configured to form a space for receiving inflow of the liquid;

a second space forming section opposed to the other side of the releasing and blocking section and configured to form a space for receiving inflow of the liquid;

a first inflow section connected to the channel section, configured to form an inflow route of the liquid from the channel section to the first space forming section, and having a channel sectional area smaller than a channel sectional area of the channel section; and a second inflow section connected to the channel section, configured to form an inflow route of the liquid from the channel section to the second space forming section, and having a channel sectional area larger than the channel sectional area of the first inflow section and smaller than the channel sectional area of the channel section.

6. The suspension device according to claim 5, wherein the partitioning member includes a communication channel configured to allow the flow of the liquid between the first liquid chamber and the second liquid chamber, the pressure buffer device further comprises a rod member, which is a bar-like member, the rod member is configured to hold one end side of the partitioning member in an axis direction and move in the axis direction, and the channel section is formed in the rod member.

7. The suspension device according to claim 5, further comprising:

an opposed member provided to be opposed to the releasing and blocking section, wherein the second inflow section is configured by a cutout provided in the opposed member and formed to connect the channel section and the second space forming section.

8. The suspension device according to claim 5, further comprising:

an opposed member provided to be opposed to the releasing and blocking section, wherein the second inflow section is configured by a hole provided in the opposed member and formed to connect the channel section and the second space forming section.

* * * * *